Jan. 12, 1971 W. W. KRAMER ETAL 3,553,847
FLUIDIZED BED REACTOR

Filed Sept. 9, 1968 3 Sheets-Sheet 1

INVENTORS
WALTER W. KRAMER &
WILLIAM KOREN

BY Jack L. Prather
ATTORNEY

United States Patent Office 3,553,847
Patented Jan. 12, 1971

3,553,847
FLUIDIZED BED REACTOR
Walter W. Kramer and William Koren, Allentown, Pa., assignors to Fuller Company
Filed Sept. 9, 1968, Ser. No. 758,207
Int. Cl. F26b 17/10
U.S. Cl. 34—57               7 Claims

ABSTRACT OF THE DISCLOSURE

A fluid bed reactor gas distribution grid of steel plate construction having an upper plate and a lower plate spaced therefrom wherein the lower plate includes a radially outwardly extending peripheral ring portion clamped between the reactor base plate and windbox grid support ring and having a floating non-heat conductive seal between the grid ring portion and reactor base plate so as to not only provide a three-way seal between the atmosphere, reactor bed chamber and windbox, but to also allow the lower grid plate to expand, and the upper grid plate being provided with means for allowing it to expand relative to the lower grid plate and connecting grid side wall, and wherein the lower grid plate is in direct heat transfer relation with the grid support ring to provide means for transferring heat from high bed temperature to the outer windbox shell, and the exterior dimension of the grid being such as to provide a clearance between the grid side wall and adjacent reactor refractory which clearance is loosely packed with insulation material to further assist the seal and to protect the reactor base ring from the detrimental effect of high bed temperatures.

---

The present invention relates to a fluid bed reactor improved grid plate design.

More specifically, the present invention relates primarily to a steel gas distribution grid design for either multistage or single stage fluid bed reactors, which is simple of design, of inexpensive construction, and provides means for relieving stress on the grid plate in those areas where it is joined to the reactor, such means being in effect a floating seal constructed in such a manner as to additionally provide for the transfer of heat from this area of stress to the outer shell of the preheat plenum chamber or windbox, as it is more commonly referred to.

In the prior art, there is generally known two types of grid plates for the type of application as contemplated in the present invention. Both types include, as does our present invention, perforations or holes extending through the depth of the grid plate for transferring fluidizing gas from a lower plenum chamber to the upper material bed chamber of the fluid bed reactor. Both types may include additional means within or extending through the depth of the grid plate for injecting fuel into the fluidized bed of materials within the reactor, where the purpose of the reactor is to carry on a heat operation. The one type includes a flat steel plate extending across the full diameter of the reactor vessel, or width as the case may be. This grid plate is generally satisfactory for temperatures up to approximately 1400° F. Of course, at such high temperatures a special steel is used; namely, stainless. Beyond this temperature it was found that the grid plate would warp due to thermal expansion and not only would disrupt the controlled pressure drop across the plate which must be maintained in order to maintain a constant rate of fluidization, but it also would cause certain other mechanical problems. Therefore, a second type of grid plate was used; namely, a ceramic or refractory grid, which may be made of any number of heat resistant refractory materials. A refractory of 90 percent alumina is common. This second type of grid plate, however, is generally quite expensive and due to its burdensome weight, causes certain installation difficulties. Furthermore, the refractory grid normally comprises a plurality of poured sections. These poured sections must include additional means to insure against leaks and relative movement between sections, which would destroy the control of pressure drop.

In brief summary, our improved grid is of the type adapted to be clamped between the base ring of the reactor shell and the grid support ring of the windbox. The grid is constructed of an upper plate and a lower plate, the two being spaced from, but connected to, one another by means of a grid side wall portion. The lower plate is larger in diameter, therefore providing a peripheral edge portion to be clamped between the two reactor halves, which will provide the sole means for suspending the grid plate. This peripheral edge portion of the lower grid plate abuts directly against the windbox grid support ring, which in turn is connected to the outer metal windbox shell. This then provides a heat sink for conducting temperature away from the grid plate in those critical areas of the grid plate where high stresses cause failure, and also provides the means for conducting heat away from the reactor base ring. The other surface of the peripheral edge portion of the lower grid plate has between it and the reactor base ring, a flexible seal ring or plurality of rings of non-heat conductive material, preferably asbestos rope to provide a three-way seal between the atmosphere, reactor bed chamber, and the preheat plenum chamber. The lower grid plate may be doughnut shape or of solid steel plate across its full diameter. With the latter type of construction, the grid may be filled with a refractory material and the upper plate removed, so as to allow the grid plate of our design to be used for even higher bed temperatures than that customary for steel plate grids. The former type may be additionally provided with means to allow the upper grid plate to expand freely relative to the grid side wall.

It is thus an object of our invention to provide an improved gas distribution grid for use in fluid bed reactors.

It is a further object of our invention to provide a grid which is flexibly connected to a reactor vessel, so as to allow for expansion of the grid plate during heat operations, but yet will also provide an effective seal to prevent hot gas from escaping from the reactor.

It is the further object of our invention to provide a grid plate which may be used at higher temperatures than those of the type previously known, and which can be of steel plate construction exclusively or in combination with a refractory material.

It is a further object of our invention to provide a grid of such design as will permit the reactor base ring to be insulated from detrimentally high material bed temperatures.

It is yet another object of our invention to provide a certain portion of the grid itself to expand relative to other portions of the grid, so as to prevent warping due to thermal expansion, but yet without disturbing the control of the pressure drop across the grid.

Further objects and advantages of our invention will be apparent to those skilled in the art from detailed description given below, taken in connection with the accompanying drawings, in which.

Figure 1:
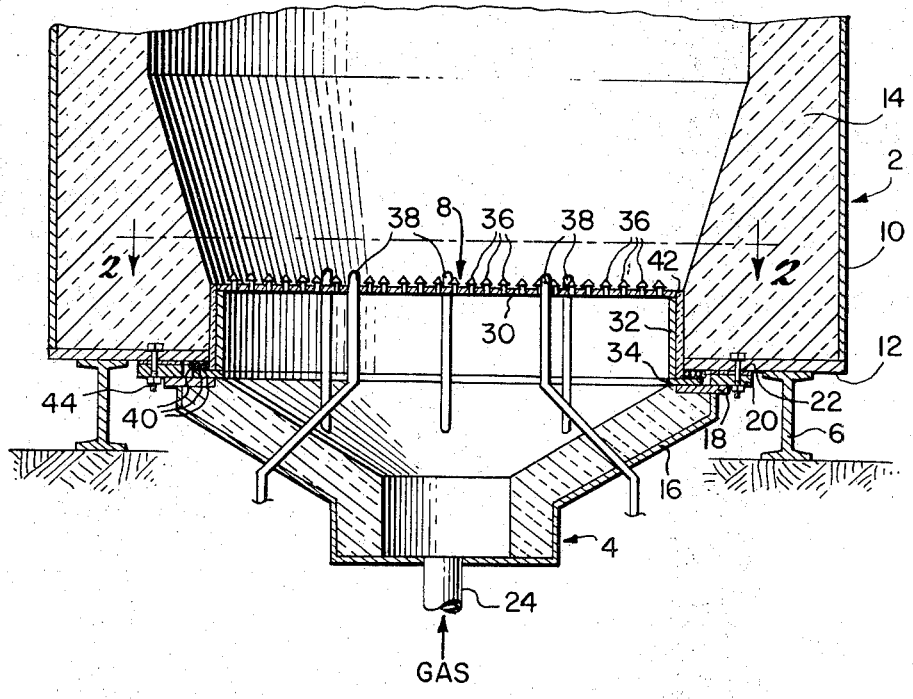
FIG. 1 is a transverse vertical sectional view of the gas distribution grid and an adjacent portion of a fluid bed reactor in accordance with out present invention.

In FIG. 1 there is shown a single stage fluid bed reactor comprising an upper bed chamber portion 2 and a lower preheat plenum chamber portion or windbox 4. The entire fluid bed reactor is supported by suitable supports 6. Between the upper and lower portions 2 and 4 of the fluid bed reactor there is positioned a perforated gas distribution grid shown generally as 8. The upper portion of the reactor comprises a metal outer shell 10. The bottom wall 12 of upper portion 2 comprises a circular steel base ring of greater thickness than the side wall 10 and connected thereto by any suitable means, preferably by welding. The interior of reactor portion 2, which may be referred to as the fluidizing bed chamber, is lined with any suitable refractory material 14 as is well known in the art. The windbox 4 also comprises an outer steel shell 16 connected to a steel grid support ring 18 by any suitable means, but preferably by welding. A third steel ring 20 is in turn connected to grid support ring 18, preferably by means of welding and can be considered part of grid support ring 18 itself. One surface thereof may be considered as abutting directly against steel ring 12. However, it is considered advantageous to provide a thin gasket 22 of ⅛ inch asbestos paper between the grid support ring and base ring 12 to perfect a good seal and to inhibit the flow of heat to the outer reactor shell 10. Gas, usually air, is supplied to windbox 4 from a source (not shown) via conduit 24. Since our grid plate is designed primarily for fluid bed reactors, wherein a heat reaction is to take place, it is common to supply preheated air through the conduct 24 from said source, so as to reduce the rate of fuel consumption. The means for supplying preheated air to conduit 24 and windbox 4 is well known in the art as is illustrated in the patent to Perlman et al. 3,040,438.

Figure 2:
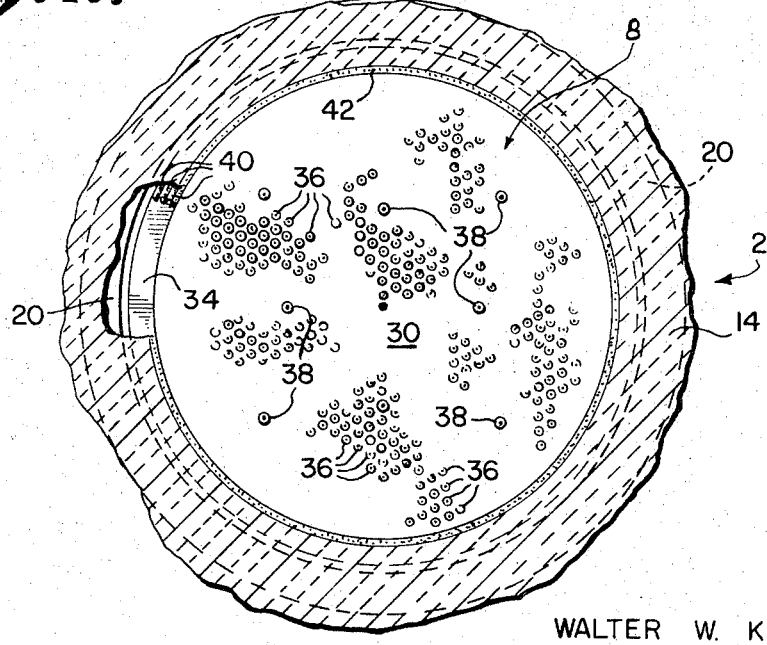
FIG. 2 is a cross sectional view of the grid and fluid bed reactor taken along lines 2—2 of FIG. 1.

The gas distribution grid itself, as shown in FIGS. 1 and 2, comprises an upper plate 30, a side wall 32, and a lower plate 34, all of which is connected in any suitable manner, but in most applications preferably by welding, to form an integral structure. Upper plate 30 includes a plurality of holes, through which are provided suitable gas distributing nozzles 36. These nozzles may be of any one of a number of suitable constructions well known in the art, as is shown, for example, in the aforesaid patent to Perlman et al. 3,040,438 and also the patent to Frost 3,040,439. The number of nozzles provided in any one grid plate will be determined primarily in accordance with the standards of providing uniform fluidization across the entire surface of the grid and the desired pressure drop to be maintained across the grid in order to fluidize the particulate materials being treated. The upper plate 30 is also provided with perforations to receive the main fuel supply lines 38 which inject fuel, usually either a fuel oil, natural gas, or ground coal into the bed of materials from a common source (not shown). Again the number of fuel lines 38 will depend upon the amount of heat needed to produce the reaction desired. They should, of course, be uniformly distributed throughout the upper grid plate 30. As shown, the lower grid plate 34 is doughnut shaped, or in other words is open to allow the fluidizing gas to flow directly to the upper plate 30. The bottom surface of lower grid plate 34 abuts directly against ring 18 of the windbox 4 to provide a heat sink. The other surface of lower grid plate 34 has positioned between it and the adjacent surface of base ring 12 a flexible seal, shown here as a plurality of asbestos rope rings 40. Regardless of whether or not asbestos rope is used as the flexible seal, it is preferred that whatever seal is used it be non-heat conductive. The outermost peripheral edge of lower grid plate 34 is spaced from the adjacent edge of ring 20 of windbox 4. Also, there is provided a clearance between the exterior surface of side wall 32 and the adjacent surface of the refractory lining 14. These clearances are for allowing the grid plate to expand freely during high temperature operations. The seal maintained by asbestos rope rings 40 is further assisted by loose mineral wool 42, or the like, insulation being loosely packed in the clearance between grid side wall 32 and the refractory 14. The fact that the upper grid plate 30 is positioned above the reactor base ring 12 and that the clearance between the grid side wall and reactor refractory lining 14 is packed with an insulating material protects the base ring from the high temperatures maintained in the bed. The two vessel portions 2 and 4 are clamped to one another by any suitable means, but preferably by a series of bolts 44, since this provides the unique advantage of being able to drop the windbox and grid assembly away from the reactor for purposes of inspection and maintenance.

Figure 3:
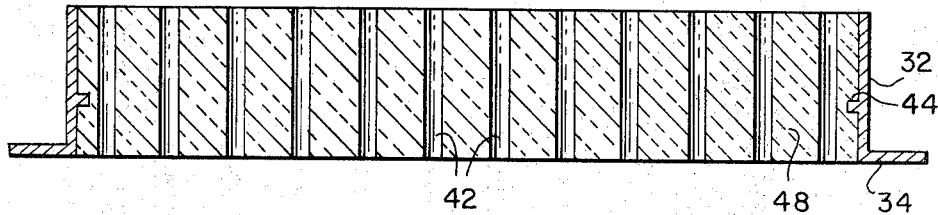
FIG. 3 is a transverse vertical sectional view of a modification of the grid plate according to our present invention.

In FIG. 3, there is shown a modification of the grid plate, wherein it is seen to comprise as its steel members only the side wall 32 and the integral bottom grid plate 34 in lieu of the top plate 30 of FIGS. 1 and 2. The entire grid plate is filled with a refractory 48. The refractory 48 is provided with a plurality of holes 49 to provide the means for distributing gas and fuel to the materials to be treated in a manner similar to that described in FIG. 1. These holes may be provided with gas distributing nozzles, however, if the nature of the material being treated is such that it will not flow through these holes 42 during shutdown or otherwise, then no nozzle, as aforedescribed, will be necessary. The side wall 32 is provided with means for preventing the refractory from becoming disengaged from the steel shell. Any suitable means may be provided, such as integral key ring 55.

Figure 4:
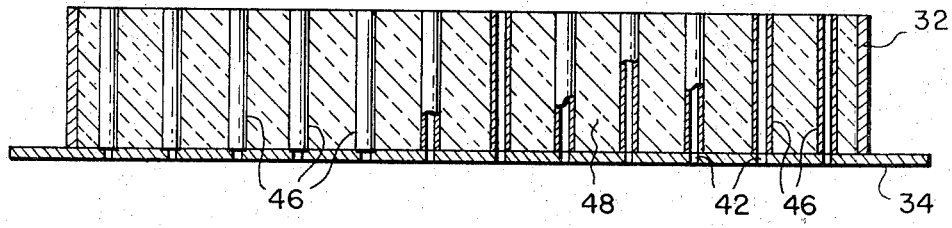
FIG. 4 is a transverse vertical sectional view of still another modification of the grid plate of our present invention.

In FIG. 4, there is shown a further modification of the gas distribution grid, wherein lower plate 34 is not cut out at its middle, but is perforated only to the extent necessary to provide holes 56 for distributing gas upwardly to the bed of materials to be fluidized. In addition, steel pipes 46 are welded or otherwise connected to the lower plate 34. These steel pipes may have inserted or otherwise fastened thereto suitable gas distributing nozzles as aforedescribed. Refractory material 48 is poured into the structural steel enclosure to complete the grid plate.

These combination structural steel and refractory grid plates have been found to be quite satisfactory in temperature ranges from 1400° F. to 2400° F. They are not susceptible to the degree of thermal expansion in those grid plates which are exclusively of steel construction. However, if there is some thermal expansion, it is compensated for by the present design of the grid plate with its floating seal arrangement as aforedescribed in connection with FIGS. 1 and 2.

Figure 5:
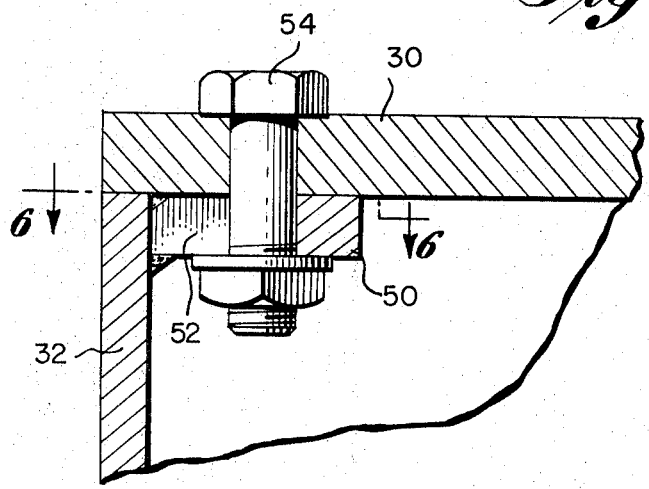
FIG. 5 is a longitudinal cross sectional view of a portion of the grid shown in FIGS. 1 and 2, showing a modification thereof which permits greater thermal expansion of the upper grid plate relative to the grid side wall.
Figure 6:
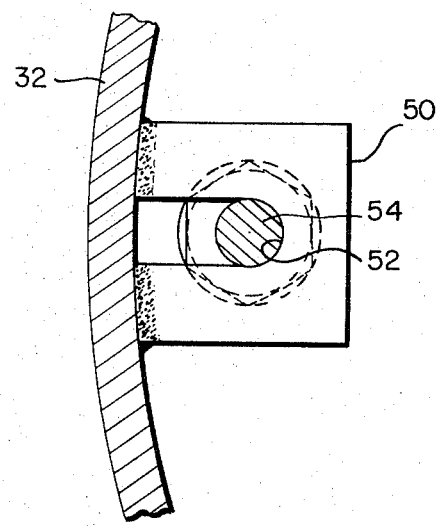
FIG. 6 is a sectional view taken along lines 6—6 of FIG. 5.

In FIGS. 5 and 6, there is shown a modification of the grid illustrated in FIGS. 1 and 2, which permits upper grid plate 30 to expand relative to grid side wall 32. At high bed temperatures approximating 1800° F. in which this type of grid is sometimes used, the upper plate 30 may thermally expand to such an extent greater than side wall 32 that it will bow upwardly which would cause physical difficulties as well as adversely affecting the control of pressure drop across the grid. To prevent this, we provide a plurality of brackets 50 welded or otherwise connected to the interior surface of grid side wall 32, preferably equally spaced from one another. Each bracket includes a key slot 52. The upper grid plate 30 is connected to grid side wall 32 solely by means of bolts 54. When upper plate 30 expands relative to side wall 32, it will do so freely since the bolts 54 will slide in the key slot 52. Other means of allowing for relative expansion will be obvious to those skilled in the art. Similarly, if in certain applications or other grid designs it is found that other members of the grid detrimentally expand relative to one another, similar means may be provided to compensate for this. It may also be desirable to increase the clearance between the reactor lining and area adjacent the upper grid plate to allow for excessive expansion.

To further illustrate several important features of our invention, reference is made to a standard size 30 foot high fluid bed reactor of approximately 7'6" external diameter having a grid of approximately 66 inches diameter and a refractory lining of approximately 11 inches thickness in the area of the grid, and wherein the bed temperature is approximately 1800° F. and the preheated gas enters the preheat plenum chamber at approximately 1000° F. The base ring is of 1¼ inch stock. Using the prior art grid design of a single flat plate as aforedescribed, the reactor base ring 12 would be at bed temperature; namely, 1800° F. The temperature of the reactor shell 10 would be approximately 200° F. since this is the usual temperature drop experienced across the 11 inches of refractory. This large temperature difference between the outermost and innermost portions of the base ring will cause the base ring to warp, which will thus cause cracking of the refractory lining. With our design, the temperature of the innermost portion of base ring 12 will be approximately 800° F., which will not cause warping. The base ring is not only spaced away from and insulated from the bed, but also the heat of the upper grid plate is transferred to the windbox shell 16. It has been found desirable to use ¾ inch stock for both rings 18 and 20 of the grid support ring. When clamping windbox 4 to base ring 12, it is desirable to maintain enough pressure on seal rings 40 to withstand the pressure drop across the grid which is usually in the order of no more than 25 inches water gage depending on the nature of the material to be fluidized and treated.

While we have shown our preferred embodiment with several modifications, we do not wish to limit ourselves to the precise instructions disclosed, but reserve the right to resort to various modifications and changes in shape, size and arrangement of parts, and the like without departing from the spirit of our invention or the scope of the appendant claims.

We claim:

1. In a fluidized bed reactor for fluidizing and treating particulate materials and having an upper bed chamber portion in which said materials are treated, lower plenum chamber portion having a source of fluidizing gas leading thereto and a gas distributing grid disposed between said upper bed chamber portion and said lower plenum chamber portion for distributing fluidizing gas to said upper bed chamber portion, the improvement comprising:

said reactor upper bed chamber portion including an outer cylindrical shell, an inner refractory lining, and a base ring connected to said shell at the bootom thereof to provide a support for said inner refractory lining, said lower plenum chamber portion including an outer heat-conductive shell forming a side wall thereof and having a heat-conductive grid support ring means at the top thereof for supporting said grid and being in overlapping relation with said base ring, said grid support ring means being in direct heat conductive relation with both said side wall and said grid, said grid including bottom wall means, at least a portion of which is disposed between said overlapping portions of said base ring and said grid support ring means, and a flexible, non-heat conductive seal means disposed between said portion of said grid bottom wall means and said base ring.

2. A reactor as defined in claim 1 wherein:

said grid support ring means comprises a raised ring portion for providing means for securing said lower plenum chamber portion to said base ring and for providing a clearance space between said base ring and grid support ring means in which to allow said grid to expand and in which to dispose said seal means.

3. A reactor as defined in claim 2 wherein:

said grid further comprises top wall means and side wall means, said side wall means being spaced from said inner refractory lining, and insulating material being loosely packed in the space between said grid side wall means and said inner refractory lining of said upper bed chamber portion.

4. A reactor as defined in claim 2 wherein:

said grid further comprises top wall means and side wall means; and thermal expansion means for allowing said top wall means to expand relative to said grid side wall means without distortion of said top wall means and said grid side wall means.

5. A reactor as defined in claim 4 wherein said thermal expansion means comprises bracket means including at least one bracket fixed to said grid side wall means and having a slot therein, and a mechanical fastening means extending downwardly from said top wall means and through the slot of said bracket means whereby upon thermal expansion of said top wall means, said fastening means will move radially outwardly within the slot of said bracket means.

6. A reactor as defined in claim 1 wherein said grid further comprises side wall means and a refractory material having a thickness substantially equal to that of the grid side wall means, and said grid side wall means including means for securing said refractory material and grid side wall means to one another including a key means provided on said grid side wall means and a corresponding interfitting slot means in said refractory material.

7. A reactor as defined in claim 1 wherein said bottom wall means includes a flat plate having a plurality of gas distribution means therein including a plurality of pipes extending from said bottom wall means toward said reactor upper bed chamber and said grid includes a refractory material disposed on said bottom wall means and having a thickness substantially equal to the distance said pipes extend into said reactor upper bed chamber.

References Cited
UNITED STATES PATENTS

| | | | |
|---|---|---|---|
| 2,595,384 | 5/1952 | Johnson et al. | 23—288.3S |
| 2,690,962 | 10/1954 | Clarke | 23—288.3S |
| 3,008,810 | 11/1961 | Paradiso et al. | 23—57AX |
| 3,016,624 | 1/1962 | Bliss | 34—57T |
| 3,008,810 | 11/1961 | Paradiso et al. | 34—57AX |
| 3,215,508 | 11/1965 | Piester | 23—288.3S |
| 3,370,361 | 2/1968 | Guerrieri | 34—57A |

FRED C. MATTERN, Jr., Primary Examiner

R. A. DUA, Assistant Examiner

U.S. Cl. X.R.

23—284